June 21, 1960

R. G. STUTZ 2,941,792

AIRCRAFT FLIGHT PATH STABILIZER

Filed June 3, 1957

INVENTOR
RICHARD G. STUTZ

BY

AGENT

United States Patent Office 2,941,792
Patented June 21, 1960

2,941,792
AIRCRAFT FLIGHT PATH STABILIZER

Richard G. Stutz, Stratford, Conn., assignor to United Aircraft Corporation, East Hartford, Conn., a corporation of Delaware Filed June 3, 1957, Ser. No. 663,102

8 Claims. (Cl. 73—515)

This invention relates to a longitudinal stabilizing means for an aircraft and more particularly to means for achieving longitudinal dynamic stability in a helicopter.

An object of this invention is to provide an increase in tail incidence due to upward vertical acceleration of a helicopter resulting in a nose down pitching moment to counteract both the nose up pitching acceleration that accompanies the upward vertical acceleration and the vertical acceleration itself.

Another object of this invention is to provide bobweight means that will sense normal vertical accelerations. The bobweight means is located near the center of gravity of the helicopter so that it senses to a greater degree the normal acceleration of the fuselage and very little fuselage pitching acceleration. In this way the stabilizer will give fairly optimum results throughout the forward flight range which cannot be provided by sensing predominantly pitching acceleration.

A further object of this invention is to provide stabilizing means in which a small plan form horizontal tail may be utilized thus minimizing tail drag.

Another object of this invention is to provide a longitudinal stabilizing means which will sense a disturbance before the pilot and through an early tail incidence change will minimize the pitching amplitudes which a helicopter usually obtains in such a disturbance.

A further object of this invention is to provide a stabilizing means which will not alter the static trim characteristics of the helicopter in either autorotation or powered flight.

Another object of this invention is to provide an aircraft stabilizer which operates independently of the main rotor. Characteristically, as helicopter speed is increased, the main rotor gets closer to a stall condition and is harder to control and becomes more unstable. The tail stabilizer on the other hand becomes more powerful and more difficult to stall with increasing forward speed.

Other objects and advantages are apparent from the specification and from the accompanying drawings which illustrate the invention.

Figure 1:
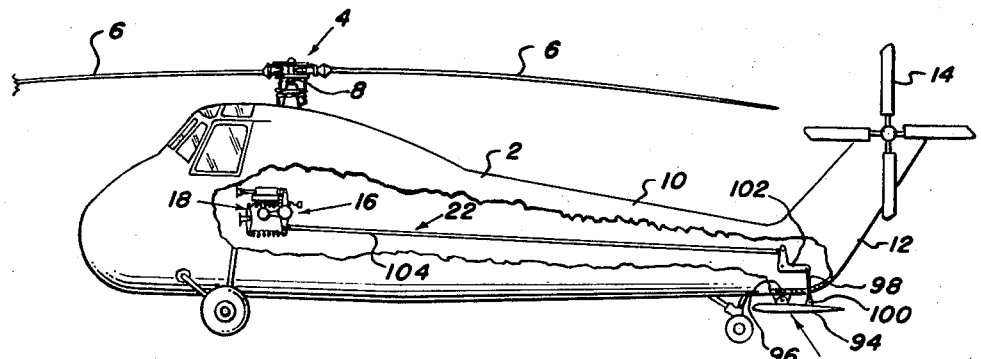
Fig. 1 is a side elevational view of a helicopter showing the invention positioned therein.

While Fig. 1 shows the silhouette of a specific helicopter, it is to be understood that the stabilizing means can be used on any type of helicopter. Further, referring to Fig. 1, a helicopter is shown having a body 2 which generally houses the pilot or cargo compartments and engine compartment. It is shown having a main rotor 4 with blades 6 attached thereto being mounted for rotation on a drive shaft 8. A pylon 12 extends upwardly from tail cone 10. A tail rotor 14 is mounted on said pylon. This helicopter may be controlled by any control mechanism desired; such a control mechanism is shown in the patent to Alex, United States Patent No. 2,720,271.

The stabilizing means 16 comprises three main parts: (1) the actuating means 18, (2) the horizontal stabilizer 20, and (3) the connecting linkage 22.

Figure 2:
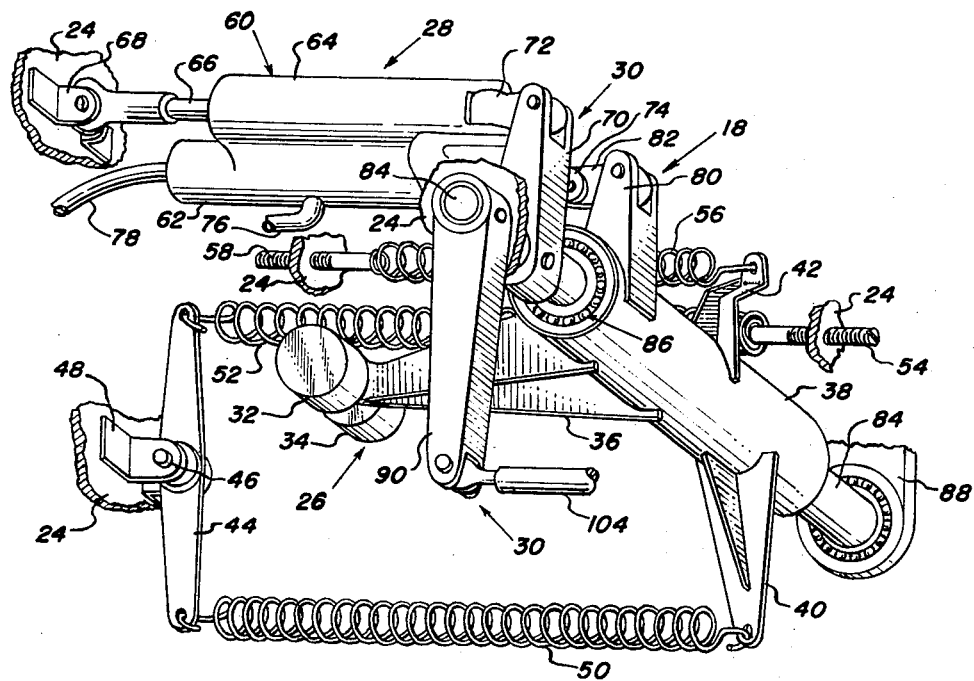
Fig. 2 is an enlarged view of the bobweight and its mounting means with its housing broken away.

The actuating means 18 is mounted within a housing 24, parts of which are shown in Fig. 2. This actuating means is made up of several component parts which are the following: (a) a bobweight means 26, (b) a servo mechanism 28, and (c) an output linkage 30 which is connected to the linkage 22 of the stabilizing means.

The bobweight means comprises a bobweight made up of two parts 32 and 34 which are fixed on either side of a lever arm 36. Lever arm 36 extends from a tubular member 38. Tubular member 38 is mounted for rotation within housing 24 in a manner to be hereinafter described. Since the bobweight 32, 34 is to be positioned in a horizontal plane passing through or near said tubular member 38, spring means are needed to maintain said bobweight in this position.

This spring means consists of a lever arm 40 extending downwardly from said tubular member 38 and a lever arm 42 extending upwardly from tubular member 38. Pivoted to the side of housing 24 in a plane normal to the axis of tubular member 38 and which passes through the free ends of levers 40 and 42 is a lever 44 pivoted intermediate its ends at 46 to a bracket 48. Bracket 48 is fixed to housing 24 by any means desired. A spring 50 is connected at one end to the free end of lever 40 and is connected at its other end to the lower end of lever 44. A second spring 52 is fixed at one end to the upper end of lever 44 and is attached at its other end to housing 24 by an adjustable screw 54. Spring 52 also lies in the normal plane referred to above and this position is made possible by an offset in the lower portion of lever 42. Spring 56 is connected at one end to the free end of lever arm 42 and is connected at its other end to an adjustable screw 58 in housing 24. In the arrangement just described, all of the springs 50, 52 and 56 are located in the plane normal to the axis of tubular member 38, referred to above. By adjustment of screws 54 and 58, the position of the bobweight 32, 34 can be varied or the force exerted on the bobweight can be changed. To vary the position of the bobweight 32, 34, one or the other of adjustable screws 54 and 58 can be actuated. However, to change the forces acting on the bobweight 32, 34, both adjustable screws can be actuated. For example, to keep the bobweight in the same plane and increase the tension of the springs upon it, both screws 54 and 58 can be tightened a desired amount while leaving the bobweight position unchanged.

The servo mechanism 28 has a unit consisting of a servo motor 60 and a servo valve 62. The servo motor comprises a cylinder 64 with a piston mounted therein for axial movement, said piston having a piston rod 66 extending from one end of said cylinder. Piston rod 66 has its free end fixed to housing 24 by the use of a bracket 68. The bracket 68 may be connected to the housing 24 by any means desired. The end of cylinder 60 opposite from the end through which piston rod 66 projects is attached to the free end of a lever 70 by a link 72. Link 72 is pivoted at one end to the cylinder 64 and pivoted at its other end to the lever 70 to be hereinafter described. Servo valve 62 is fixed to said cylinder and is controlled by a rod 74 connected to a lever 80 by a link 82. Lever 80 extends from tubular member 38 and moves therewith. This servo valve 62 is constructed as a servo valve that, in accordance with its actuation by rod 74, will direct a fluid under pressure from conduit 76 to one side of the piston in cylinder 64 and connect the opposite side to drain conduit 78. In this device, as the rod 74 is moved to the left, fluid pressure is directed to the left side of the piston in the servo motor 60 while the right side of the piston is connected to drain. This action moves cylinder 60 to the left and therefore moves the attached end of lever 70 to the left through link 72.

Tubular member 38 is mounted for rotation within housing 24 on a rod 84 which is in turn mounted for rotation in said housing. Tubular member 38 has bearing units 86 located at each end thereof which are mounted between the inner surface of the tubular member 38 and the outer surface of the rotatable rod 84. One end of rod 84 is mounted for rotation in a bracket member 88 extending into the interior of housing 24 while the other end of rod 84 is mounted in a bearing unit located in the side of housing 24 at which point rod 84 extends to the exterior of said housing. The bearing unit located at this point for rod 84 is also provided with sealing means. This bearing and sealing unit mounted in the side of housing 24 is not shown in view of the location of lever arm 90.

Lever 70, referred to above, is fixedly attached to rod 84 so that motion may be transmitted therebetween. This lever 70 comprises part of the output linkage 30. Another part of this output linkage is lever 90 which is fixedly attached to the end of rod 84 which extends to the exterior of housing 24. The free end of this lever 90 is attached to the connecting linkage 22 of the stabilizing means.

The horizontal stabilizer 20 comprises a stabilizing surface 94 which is pivotally mounted to the helicopter body 2 at 96. The connecting linkage 22 includes a link 98 which extends through a hole in the helicopter and is pivotally connected to the surface 94 at a point 100 rearwardly of the pivotal mounting 96. The upper end of link 98 is attached to one end of a bell crank lever 102 which is pivotally mounted within the helicopter body 2. A link 104 is pivotally mounted to the other end of bell crank lever 102 and to the free end of lever 90. Means for damping the action of the bobweight should be provided to control its effect. In the construction shown, the housing 24 is filled with oil so that it is necessary for the bobweight to move through said oil. While this type of damper has been shown, other types of dampers may be used such as a cylinder and piston arrangement between the bobweight and fixed helicopter structure.

*Operation*

It is to be remembered that the best results from this device are obtained at the higher speeds in cruising flight. For example, if the range of speeds for a helicopter were from zero to 100 knots, the approximate range which would provide for greater stabilization would be in the 50 to 100 knots range. Assuming the helicopter to be flying forwardly in substantially horizontal flight and that it encounters a sudden upward gust or air disturbance resulting in a simultaneous nose up pitching acceleration and upward vertical acceleration of the helicopter, the bobweight 32, 34 will lag behind the vertical movement upward of the helicopter placing an input in the stabilizing means. This relative movement of the bobweight 32, 34 with respect to the helicopter rotates lever 80 to the left as viewed in Fig. 2. This movement of lever 80 results in the movement of the rod 74 to the left which, through the action of the servo valve 62 and servo motor 60, moves lever 70 to the left. This movement of lever 70 to the left rotates rod 84 which in turn rotates lever 90 fixed thereto where it projects externally from housing 24. This lever 90 is moved to the right whereby its motion is transferred by link 104 to rotate bell crank lever clockwise so as to impart a downward movement through link 98 to the rearward end of surface 94. Therefore, it would seem that an upward vertical acceleration of the helicopter which is accompanied by a nose up pitching acceleration causes an increase in the surface angle of incidence which results in a nose down helicopter pitching movement. It can be seen that, as the surface 94 has its angle of incidence increased, it increases its angle of attack to the air moving relative to said helicopter thereby exerting an upward force through said surface to the tail of said helicopter.

In an opposite manner the stabilizer would operate for a downward gust or air disturbance producing a nose up corrective movement in the helicopter.

While specific drawings and description form this specification, it is to be remembered that various modifications can be made without departing from the spirit of the claimed subject matter appended hereto.

I claim:

1. A stabilizing device for an aircraft comprising a housing, a first shaft rotatively mounted in said housing and having a portion projecting through one side, a tubular shaft surrounding a portion of said first shaft in said housing and being mounted for relative rotation therewith, a first input arm fixed to said tubular shaft and extending therefrom, a weight fixed along the length of said first arm, a second arm fixed to said tubular shaft and extending therefrom, a third arm fixed to said first shaft in said housing and extending therefrom, means connecting said second and third arms to transmit motion therebetween, first means biasing said tubular shaft about its rotative axis in one direction, second means biasing said tubular shaft about its rotative axis in the other direction, and a fourth output arm fixed to said first shaft on the portion which projects out of said housing.

2. A stabilizing device for an aircraft comprising a housing, a first shaft rotatively mounted in said housing and having a portion projecting through one side, a tubular shaft surrounding a portion of said first shaft in said housing and being mounted for relative rotation therewith, a first input arm fixed to said tubular shaft and extending therefrom, a weight fixed along the length of said first arm, a second arm fixed to said tubular shaft and extending therefrom, a third arm fixed to said first shaft in said housing and extending therefrom, means connecting said second and third arms to transmit motion therebetween, first means biasing said tubular shaft about its rotative axis in one direction, second means biasing said tubular shaft about its rotative axis in the other direction, said first and second means being adjustable to control the position of said weight, and a fourth output arm fixed to said first shaft on the portion which projects out of said housing.

3. A stabilizing device for an aircraft comprising a housing, a first shaft rotatively mounted in said housing and having a portion projecting through one side, a tubular shaft surrounding a portion of said first shaft in said housing and being mounted for relative rotation therewith, a first input arm fixed to said tubular shaft and extending therefrom, a weight fixed along the length of said first arm, a second arm fixed to said tubular shaft and extending therefrom, a third arm fixed to said first shaft in said housing and extending therefrom, means connecting said second and third arms to transmit motion of said second arm and amplify its force to said third arm, first means biasing said tubular shaft about its rotative axis in one direction, second means biasing said tubular shaft about its rotative axis in the other direction, and a fourth output arm fixed to said first shaft on the portion which projects out of said housing.

4. A stabilizing device for an aircraft comprising a housing having a horizontal axis, a first shaft rotatively mounted in said housing and having a portion projecting through one side, a tubular shaft surrounding a portion of said first shaft in said housing and being mounted for relative rotation therewith, a first input arm fixed to said tubular shaft and extending therefrom in a horizontal plane, a weight fixed along the length of said first arm, a second arm fixed to said tubular shaft and extending therefrom, a third arm fixed to said first shaft in said housing and extending therefrom, means connecting said second and third arms to transmit motion therebetween, first means placing a first torque on said tubular shaft about its rotative axis in the same direction as said weight, second means placing a second torque on said tubular shaft about its rotative axis in the other direction, said second torque being equal to the first torque plus the torque applied to the tubular shaft by said weight times the length of its arm, and a fourth output arm fixed to said first shaft on the portion which projects out of said housing.

5. A stabilizing device for an aircraft comprising a housing, a first shaft rotatively mounted in said housing and having a portion projecting through one side, a tubular shaft surrounding a portion of said first shaft in said housing and being mounted for relative rotation therewith, a first input arm fixed to said tubular shaft and extending therefrom, a weight fixed along the length of said first arm, a second arm fixed to said tubular shaft and extending therefrom, a third arm fixed to said first shaft in said housing and extending therefrom, means connecting said second and third arms to transmit motion therebetween, first means biasing said tubular shaft about its rotative axis in one direction, and a fourth output arm fixed to said first shaft on the portion which projects out of said housing.

6. A stabilizing device for an aircraft comprising in combination, a first shaft, first means mounting said first shaft for rotation, a second shaft, second means mounting said second shaft for rotation, a first arm fixed to said second shaft and extending therefrom, weight means fixed along the length of said first arm, a second arm fixed to said second shaft and extending therefrom, a third arm fixed to said first shaft and extending therefrom, means connecting said second and third arms to transmit motion therebetween, third means biasing said second shaft about its rotative axis, and a fourth output arm fixed to said first shaft.

7. A stabilizing device for an aircraft comprising in combination, a first shaft, first means mounting said first shaft for rotation, a second shaft, second means mounting said second shaft for rotation coaxially with said first shaft, a first arm fixed to said second shaft and extending therefrom, weight means fixed along the length of said first arm, a second arm fixed to said second shaft and extending therefrom, a third arm fixed to said first shaft and extending therefrom, means connecting said second and third arms to transmit motion therebetween, third means biasing said second shaft about its rotative axis, and a fourth output arm fixed to said first shaft.

8. A stabilizing device for an aircraft comprising in combination, a first shaft, first means mounting said first shaft for rotation, a second shaft, second means mounting said second shaft for rotation, a first arm fixed to said second shaft and extending therefrom, weight means fixed along the length of said first arm, a second arm fixed to said second shaft and extending therefrom, a third arm fixed to said first shaft and extending therefrom, transmitting means connecting said second and third arms for transmitting motion from said second arm to said third arm, third means biasing said second shaft about its rotative axis, and a fourth output arm fixed to said first shaft.

References Cited in the file of this patent

UNITED STATES PATENTS

| | | |
|---|---|---|
| 2,092,424 | Potez | Sept. 27, 1937 |
| 2,595,309 | Slater | May 6, 1952 |
| 2,630,985 | Sherry | Mar. 10, 1953 |
| 2,672,334 | Chenery | Mar. 16, 1954 |

FOREIGN PATENTS

| | | |
|---|---|---|
| 706,796 | France | Mar. 31, 1931 |
| 838,413 | France | Dec. 7, 1938 |